United States Patent
Kao

(10) Patent No.: US 10,860,519 B2
(45) Date of Patent: Dec. 8, 2020

(54) METHOD REMOTE CONTROL

(71) Applicant: YUAN High-Tech Development Co., Ltd., Taipei (TW)

(72) Inventor: Wei-Hsiang Kao, Taipei (TW)

(73) Assignee: YUAN High-Tech Development Co., Ltd., Taipei (TW)

( * ) Notice: Subject to any disclaimer, the term of this patent is extended or adjusted under 35 U.S.C. 154(b) by 0 days.

(21) Appl. No.: 16/561,112

(22) Filed: Sep. 5, 2019

(65) Prior Publication Data
US 2020/0192851 A1    Jun. 18, 2020

(30) Foreign Application Priority Data
Dec. 14, 2018 (TW) .............................. 107145308 A

(51) Int. Cl.
| | | |
|---|---|---|
| G06F 13/42 | (2006.01) | |
| G06F 1/16 | (2006.01) | |
| G06K 19/077 | (2006.01) | |
| G06F 13/40 | (2006.01) | |
| H01R 31/06 | (2006.01) | |
| H01R 27/02 | (2006.01) | |

(52) U.S. Cl.
CPC ........ *G06F 13/4221* (2013.01); *G06F 1/1632* (2013.01); *G06F 13/4027* (2013.01); *G06F 13/4282* (2013.01); *G06K 19/07741* (2013.01); *H01R 27/02* (2013.01); *H01R 31/06* (2013.01); *G06F 2213/0042* (2013.01); *G06F 2213/3804* (2013.01)

(58) Field of Classification Search
CPC .............. G06F 1/1632; G06F 13/4027; G06K 19/07741
See application file for complete search history.

(56) References Cited

U.S. PATENT DOCUMENTS

| | | | |
|---|---|---|---|
| 2018/0060270 A1* | 3/2018 | Schnell | G06F 13/4022 |
| 2018/0060771 A1* | 3/2018 | Mangin | G06Q 10/04 |
| 2019/0064879 A1* | 2/2019 | Jeansonne | G06F 13/385 |
| 2019/0374095 A1* | 12/2019 | Lord | A61B 1/00066 |

* cited by examiner

*Primary Examiner* — Henry Tsai
*Assistant Examiner* — Christopher A Daley
(74) *Attorney, Agent, or Firm* — Demian K. Jackson; Jackson IPG PLLC

(57) ABSTRACT

A method of remote control is provided. A user interface of a controlling end inputs switching control signal. A first port of the controlling end transfers the control signal to a USB connector of an image capture unit. After being handled by a processor, the control signal is transferred to at least one controlled end through a second port by a USB-C connector of the image capture unit. Thus, the controlling end connects to and communicates with the controlled end, where the controlling end operates the controlled end with the user interface. Hence, the controlling end operates the controlled end with the connection of the image capture unit without switches and network. A simple method is obtained with cost effectively reduced.

8 Claims, 3 Drawing Sheets

METHOD REMOTE CONTROL

TECHNICAL FIELD OF THE INVENTION

The present invention relates to a method of remote control; more particularly, to obtaining a simple method to effectively reduce cost and enhance KVM switch.

DESCRIPTION OF THE RELATED ART

Generally, on performing a remote operation, a KVM switch is usually mounted to operate a controlled end by a controlling end through the KVM switch.

However, in terms of the conventional KVM switch, It must be used with Internet connection. Once the Internet connection is interrupted, the operation stops. In addition, the conventional KVM switch has not only a much complicated build process but also a high cost of equipment and implementation.

Hence, the prior art does not fulfill all users' expectations on actual use.

SUMMARY OF THE INVENTION

The main purpose of the present invention is to operate a controlled end 3 by a controlling end with the connection of an image capture unit without switches and network for obtaining a simple method to effectively reduce cost.

To achieve the above purpose, the present invention is a method of remote control, comprising steps of: (a) obtaining a controlling end, where the controlling end has a user interface and a first port; (b) connecting an image capture unit to the controlling end, where the image capture unit comprises a USB connector, a processor, and a USB-C connector; the USB connector connects to the first port; and the processor connects to the USB connector and the USB-C connector; (c) connecting at least one controlled end to the image capture unit, where the controlled end has a second port; and the second port connects to the USB-C connector; and (d) inputting switching control signal; transferring the control signal to the USB connector through the first port; and, after being handled by the processor, transferring the control signal from the USB-C connector to the controlled end through the second port, where the controlling end connects to and communicates with the controlled end to further operate the controlled end through the user interface. Accordingly, a novel method of remote control is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
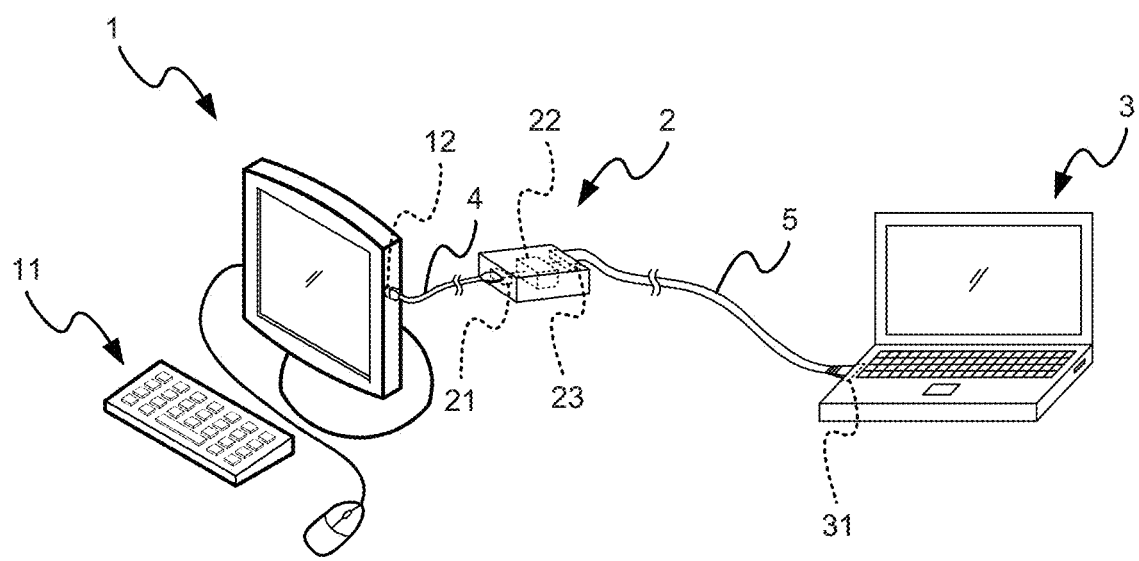
FIG. 1 is the view showing the preferred embodiment according to the present invention.
Figure 2:
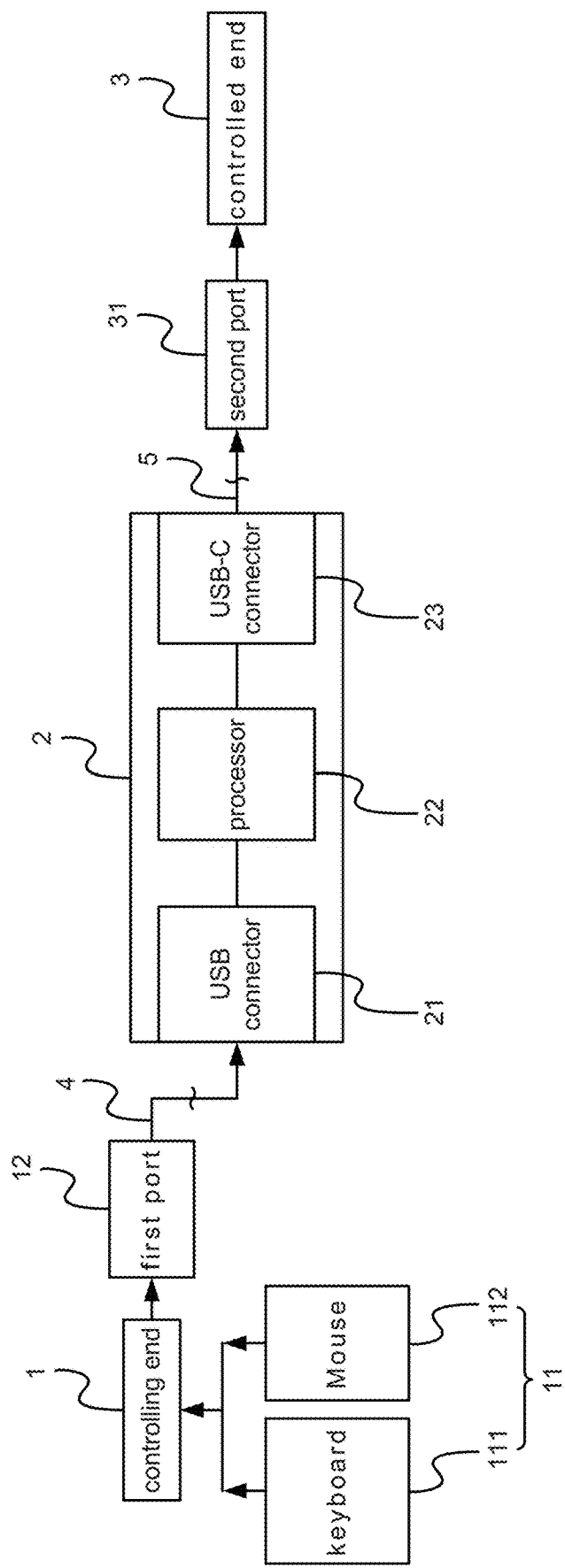
FIG. 2 is the block view showing the preferred embodiment.
Figure 3:
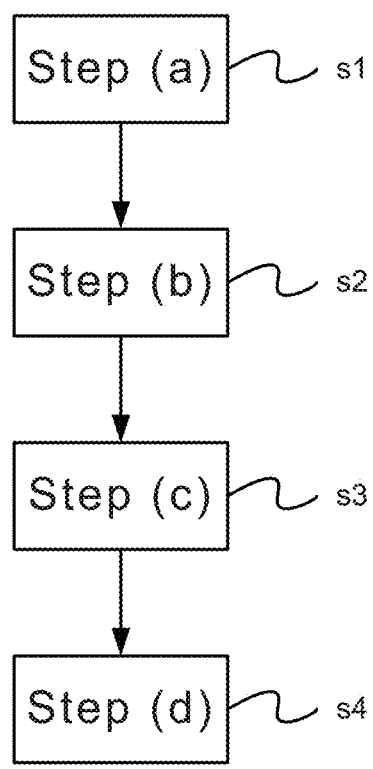
FIG. 3 is the flow view showing the preferred embodiment.

Please refer to FIG. 1 to FIG. 3, which are a view showing a preferred embodiment according to the present invention; a block view showing the preferred embodiment; and a flow view showing the preferred embodiment. As shown in the figures, the present invention is a method of remote control, comprising the following steps:

(a) Step s1: A controlling end 1 is set. The controlling end 1 has a user interface 11 and a first port 12.

(b) Step s2: An image capture unit 2 connects to the controlling end 1. The image capture unit 2 comprises a USB connector 21, a processor 22 and a USB-C connector 23. The USB connector 21 connects to the first port 12. The processor 22 connects to the USB connector 21 and the USB-C connector 23. The USB-C connector 23 has a USB 2.0 connector contained inside (not shown in the figures).

(c) Step s3: At least one controlled end 3 connects to the image capture unit 2. The controlled end 3 has a second port 31. The second port 31 connects to the USB-C connector 23.

(d) Step s4: The user interface 11 of the controlling end 1 inputs switching control signal. The first port 12 of the controlling end 1 transfers the control signal to the USB connector 21 of the image capture unit 2. After being handled by the processor 22, the control signal is transferred to the controlled end 3 through the second port 31 by the USB-C connector 23. Thus, the controlling end 1 connects to and communicates with the controlled end 1 to further operate the controlled end 3 by the controlling end 1 through the user interface 11. Hence, the controlling end 1 operates the controlled end 3 with the connection of the image capture unit 2, without switches and network for obtaining a simple method to effectively reduce cost.

In a state-of-use, the controlling end 1 is a desktop computer or a laptop computer; the user interface 11 is a keyboard 111, a mouse 112, or a combination of at least one keyboard and at least one mouse; and the controlled end 3 is a desktop computer, a laptop computer, or a server. Thus, by setting a shortcut key for starting the image capture unit 2 at the controlling end 1 or the keyboard 111 to process remote control, the mouse 112 clicks the shortcut key in the controlling end 1, or the keyboard 111 starts the shortcut key, to input the control signal through the user interface 11 for achieving easy operation.

In a state-of-use, the first port 12 is a USB 2.0 connector or a USB 3.0 connector; the USB connector 21 is a USB-C connector or a USB 3.0 connector; and the second port 31 is an HDMI connector or a Display-Port connector. Thus, the speed of signal transfer is improved to meet actual requests.

In a state-of-use, the first port 12 connects to the USB connector 21 through a first transfer interface 4; the second port 31 connects to the USB-C connector 23 through a second transfer interface 5; and the first transfer interface 4 and the second transfer interface 5 are transfer lines. Thus, the image capture unit 2 respectively connects to the controlling end 1 and the controlled end 2 through the first transfer interface 4 and the second transfer interface 5 for processing requested remote operation without network.

To sum up, the present invention is a method of remote control, where a controlling end operates a controlled end with the connection of an image capture unit without switches and network for obtaining a simple method to effectively reduce cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of remote control comprising steps of:
(a) providing a controlling end device having a user interface and a first port;
(b) connecting an image capture unit comprising a USB connector, a processor, and a USB-C connector to the first port of the controlling end device via a first wired transfer line and wherein said processor is connected to said USB connector and said USB-C connector;
(c) connecting a second port of at least one controlled end device to said USB-C connector of said image capture unit via a second wired transfer line; and
(d) inputting a wired control signal via the user interface, transferring said wired control signal to said USB connector of the image capture unit through said first port; and, after being handled by said processor, transferring said wired control signal from said USB-C connector to said controlled end device through said second port, wherein said controlling end device connects to and communicates with said controlled end device to further operate said controlled end device through said user interface via only wired communication via the image capture unit.

2. The method according to claim 1, wherein said controlling end device is selected from a group consisting of a desktop computer and a laptop computer.

3. The method according to claim 1, wherein said user interface is selected from a group consisting of a keyboard, a mouse, and a combination of at least one keyboard and at least one mouse.

4. The method according to claim 1, wherein said first port is selected from a group consisting of a USB 2.0 connector and a USB 3.0 connector.

5. The method according to claim 1, wherein said USB connector is selected from a group consisting of a USB-C connector and a USB 3.0 connector.

6. The method according to claim 1, wherein said controlled end device is selected from a group consisting of a desktop computer, a laptop computer, and a server.

7. The method according to claim 1, wherein said second port is selected from a group consisting of an HDMI connector and a Display-Port connector.

8. The method according to claim 1, wherein said USB-C connector has a USB 2.0 connector contained inside.

* * * * *